(12) United States Patent
Yamamoto

(10) Patent No.: US 8,502,887 B2
(45) Date of Patent: Aug. 6, 2013

(54) IMAGE PROCESSING APPARATUS AND METHOD

(75) Inventor: Keiichi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 12/412,134

(22) Filed: Mar. 26, 2009

(65) Prior Publication Data

US 2009/0244314 A1    Oct. 1, 2009

(30) Foreign Application Priority Data

Mar. 27, 2008  (JP) ................................. 2008-084101

(51) Int. Cl.
*H04N 5/76*    (2006.01)
*H04N 5/225*    (2006.01)
*H04N 5/228*    (2006.01)
*H04N 1/46*    (2006.01)
*G06K 15/00*    (2006.01)
*G06K 9/62*    (2006.01)

(52) U.S. Cl.
USPC .................. 348/231.3; 348/207.1; 348/222.1; 348/231.99; 348/231.2; 358/1.18; 358/537; 382/209

(58) Field of Classification Search
USPC ................ 382/209, 224, 175; 358/1.18, 452, 358/537
See application file for complete search history.

(56) References Cited

U.S. PATENT DOCUMENTS

| | | | | |
|---|---|---|---|---|
| 6,324,545 B1 * | 11/2001 | Morag | ............................ | 707/737 |
| 6,636,648 B2 * | 10/2003 | Loui et al. | ...................... | 382/284 |
| 7,518,640 B2 * | 4/2009 | Nakajima et al. | ........... | 348/231.2 |
| 2003/0002715 A1 | 1/2003 | Kowald | | |
| 2003/0072486 A1 * | 4/2003 | Loui et al. | ...................... | 382/175 |
| 2005/0044100 A1 * | 2/2005 | Hooper et al. | ................ | 707/102 |
| 2005/0111737 A1 * | 5/2005 | Das et al. | ....................... | 382/190 |
| 2005/0165841 A1 | 7/2005 | Kasperkiewicz et al. | | |
| 2005/0168779 A1 | 8/2005 | Tsue et al. | | |
| 2005/0244033 A1 * | 11/2005 | Ekin et al. | ...................... | 382/103 |
| 2006/0136456 A1 * | 6/2006 | Jacobs et al. | ................... | 707/101 |
| 2008/0007783 A1 * | 1/2008 | Terada | .......................... | 358/1.18 |
| 2008/0049976 A1 | 2/2008 | Isomura | | |
| 2011/0029635 A1 * | 2/2011 | Shkurko et al. | ................ | 709/217 |

FOREIGN PATENT DOCUMENTS

| | | |
|---|---|---|
| JP | 2006-277065 | 10/2006 |
| JP | 2006-293986 | 10/2006 |
| WO | 2007/046534 A1 | 4/2007 |

* cited by examiner

*Primary Examiner* — Michael Osinski
(74) *Attorney, Agent, or Firm* — Canon USA Inc. IP Division

(57) ABSTRACT

An image processing apparatus is provided including an acquiring unit configured to acquire information regarding a set of frames that is associated with a condition indicating a relative relationship between a set of images to be arranged in the set of frames, an extracting unit configured to extract the set of images from a plurality of images, wherein the set of images extracted satisfies the condition that is associated with the information regarding the set of frames acquired by the acquiring unit, and an arranging unit configured to arrange the set of images extracted by the extracting unit in the set of frames corresponding to the information acquired by the acquiring unit.

15 Claims, 12 Drawing Sheets

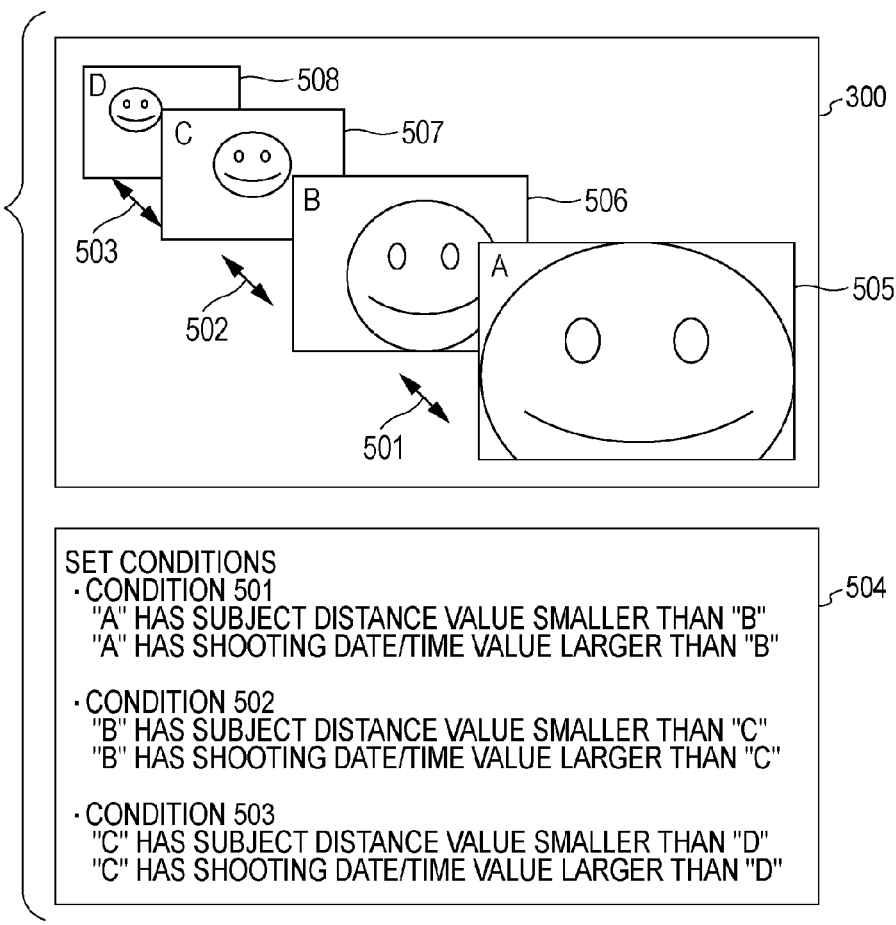

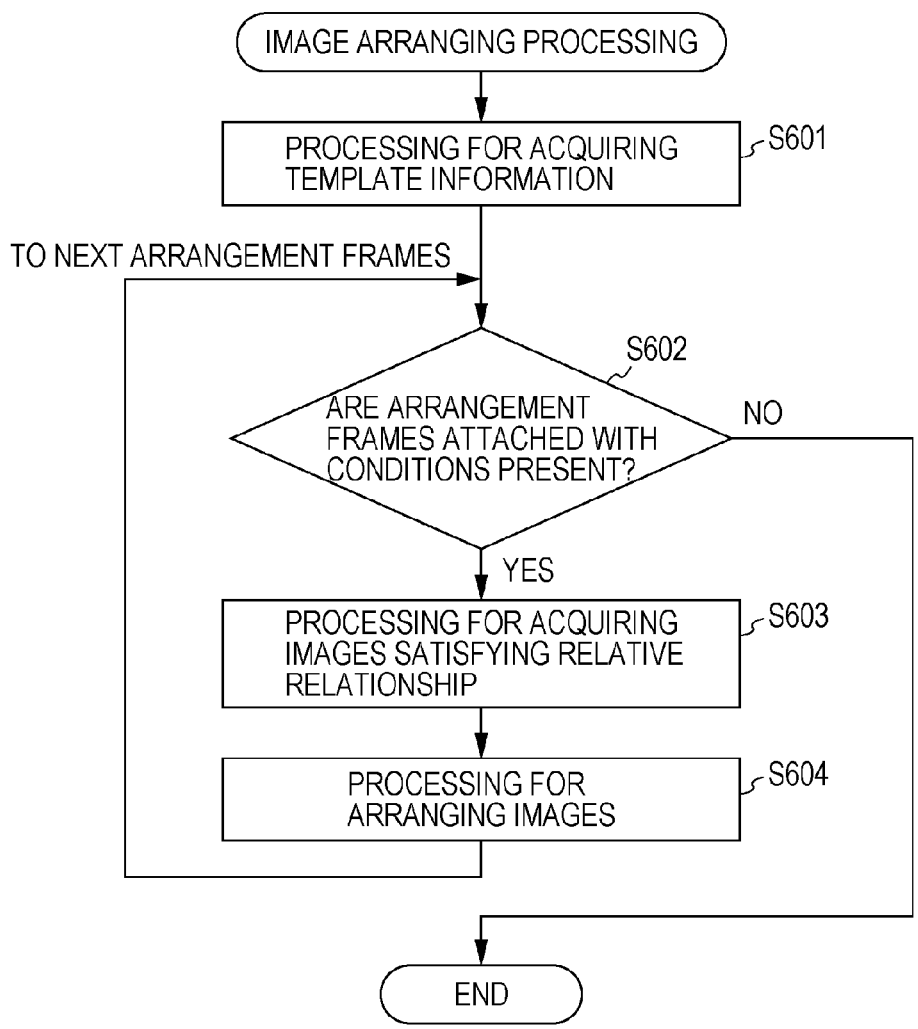

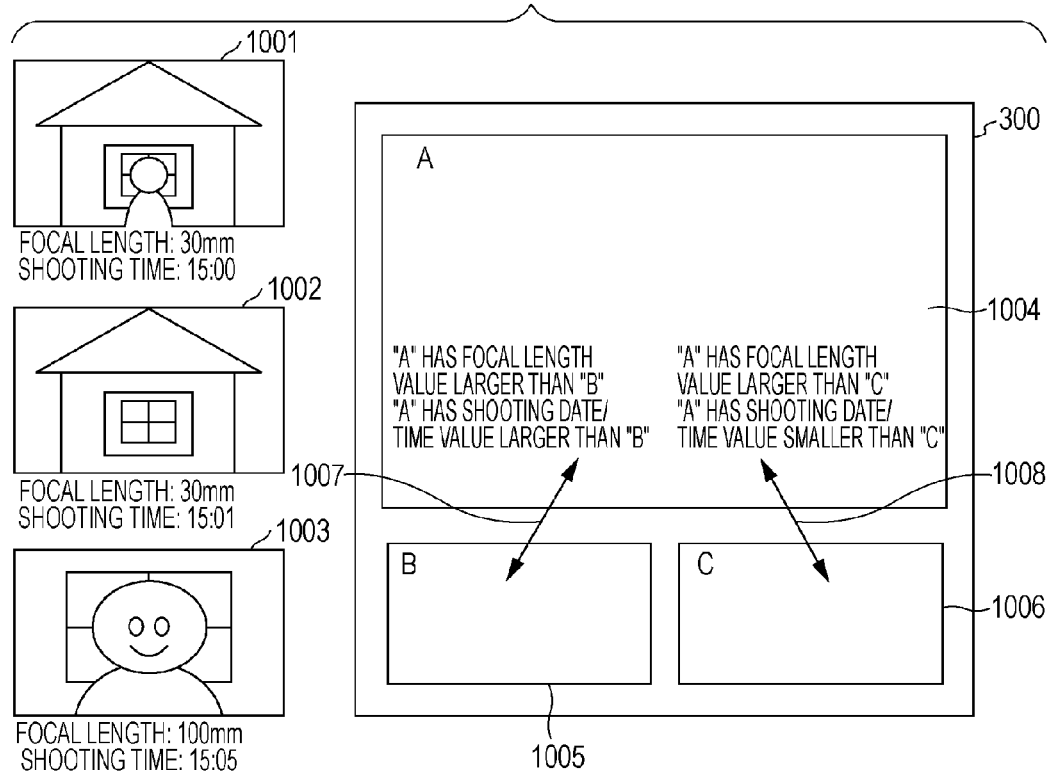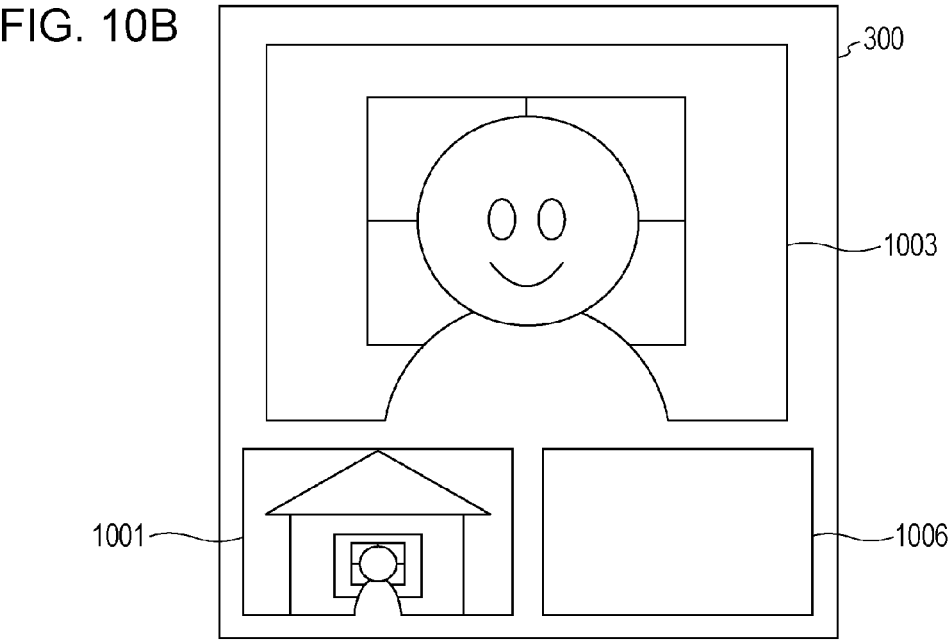

IMAGE PROCESSING APPARATUS AND METHOD

BACKGROUND OF THE INVENTION

1. Field of the Invention

The present invention relates to an image processing apparatus and method for displaying a plurality of images.

2. Description of the Related Art

With the increasing popularity of digital cameras, systems for creating an electronic album with dedicated terminals or personal computers (PCs) and displaying or printing the electronic album are widely used. The systems allow users to select images for the album, arrange the selected images in an album template to create the electronic album, and display or print the electronic album.

Users may capture many images with digital cameras, which may result in significant time expenditure for the users to select images from the many captured images and arrange the selected images in a desired layout.

To reduce the users' labor, Japanese Patent Laid-Open No. 2006-277065 proposes a method for displaying, as selection targets, images having attribute information that matches attribute information attached to a frame, in which a selected image is displayed on a screen. Since candidate images for the frame are narrowed down and displayed, this method may reduce the users' labor for selecting the image.

Japanese Patent Laid-Open No. 2006-293986 proposes a method for automatically selecting an image serving as a main image in a page, automatically extracting sub-images based on a relationship with the main image, and arranging the images on the page. This method may automate the work for selecting and arranging the images.

However, since images having attribute information that match attribute information set for a template are selected in the method proposed in Japanese Patent Laid-Open No. 2006-277065, images matching the attribute information set for the template may not extract the desired images. For example, if a focal length is set equal to 100 mm to select close-up images, the probability that images satisfying the focal length condition of 100 mm may be low. In addition, when a telephoto lens is used to capture images, the focal length of 100 mm may not indicate close-up images. Thus, intended images may not be selected.

Additionally, since sub-images are extracted similarly and are arranged on the same page as a main image in the method proposed in Japanese Patent Laid-Open No. 2006-293986, there may be a high probability that similar images are arranged on the same page. Accordingly, it may be difficult to portray a story or to include an accent image having a different look on a page.

SUMMARY OF THE INVENTION

An image processing apparatus and method for automatic selection of intended images and an image layout with image variety is provided.

According to an aspect of the present invention, an image processing apparatus includes an acquiring unit configured to acquire information regarding a set of frames that is associated with a condition indicating a relative relationship between a set of images to be arranged in the set of frames, an extracting unit configured to extract the set of images from a plurality of images, wherein the set of images extracted satisfies the condition that is associated with the information regarding the set of frames acquired by the acquiring unit, and an arranging unit configured to arrange the set of images extracted by the extracting unit in the set of frames corresponding to the information acquired.

Additionally, because a relative relationship can be set as a condition, a fixed value does not have to be set.

Further features of the present invention will become apparent from the following description of exemplary embodiments with reference to the attached drawings.

BRIEF DESCRIPTION OF THE DRAWINGS

FIG. 5 is a diagram showing an example of an image layout portraying a story according to an exemplary embodiment of the present invention.

FIG. 6 is a flowchart showing an example of image arranging processing according to an exemplary embodiment of the present invention.

FIGS. 10A and 10B are diagrams showing an example in which an image is not arranged in a frame whose condition is not satisfied according to an exemplary embodiment of the present invention.

DESCRIPTION OF THE EMBODIMENTS

Exemplary embodiments of the present invention will be described in detail with reference to the accompanying drawings. It should be understood that the present invention is not limited to the exemplary embodiments.

A description will be given, with reference to the accompanying drawings, for a first exemplary embodiment. In the first exemplary embodiment, when a condition regarding a relative relationship between a value of one image and a value of another image is set for frames in which specific images are to be arranged, the images are automatically arranged based on the condition.

Figure 1:
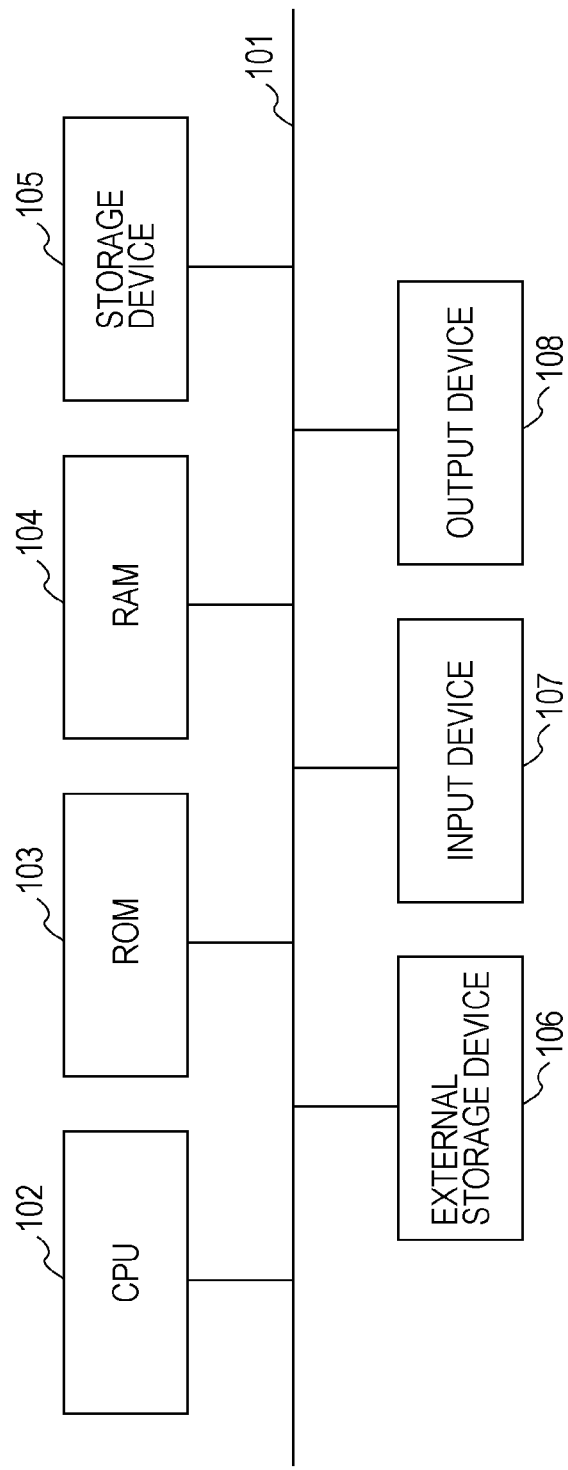
FIG. 1 is a diagram showing an example of a hardware configuration of an image processing apparatus according to an exemplary embodiment of the present invention.

FIG. 1 is a diagram showing an example of a hardware configuration of an image processing apparatus according to an exemplary embodiment of the present invention.

A central processing unit (CPU) 102 performs calculation and logical decision for various kinds of processing to control each element connected to a bus 101. The image processing apparatus includes a program memory and a data memory. The program memory stores programs for allowing the CPU 102 to control various kinds of processing, which will be described later with reference to a flowchart. The memory may be a read-only memory (ROM) 103 or a random access memory (RAM) 104, to which the programs are loaded from an external storage device.

A storage device 105 may be a hard disk drive. The storage device 105 stores data and programs according to an exemplary embodiment of the present invention. The storage device 105 is also utilized to store templates in which images and a plurality of frames are set. The images and templates may be stored in an external storage device 106, which is externally connected or connected via a network. An input device 107 receives instructions from a user. The image processing apparatus acquires user instructions through the input device 107.

An output device 108 includes an output circuit. The output device 108 may be a display device, such as a cathode ray tube (CRT) display, a liquid crystal display, a television, or a printing apparatus, such as a printer or a multifunction peripheral. Information for use in creation of an electronic album, such as images and templates, is displayed on the display device. The created electronic album may be displayed on the display device or may be printed by the printing apparatus.

Figure 2:
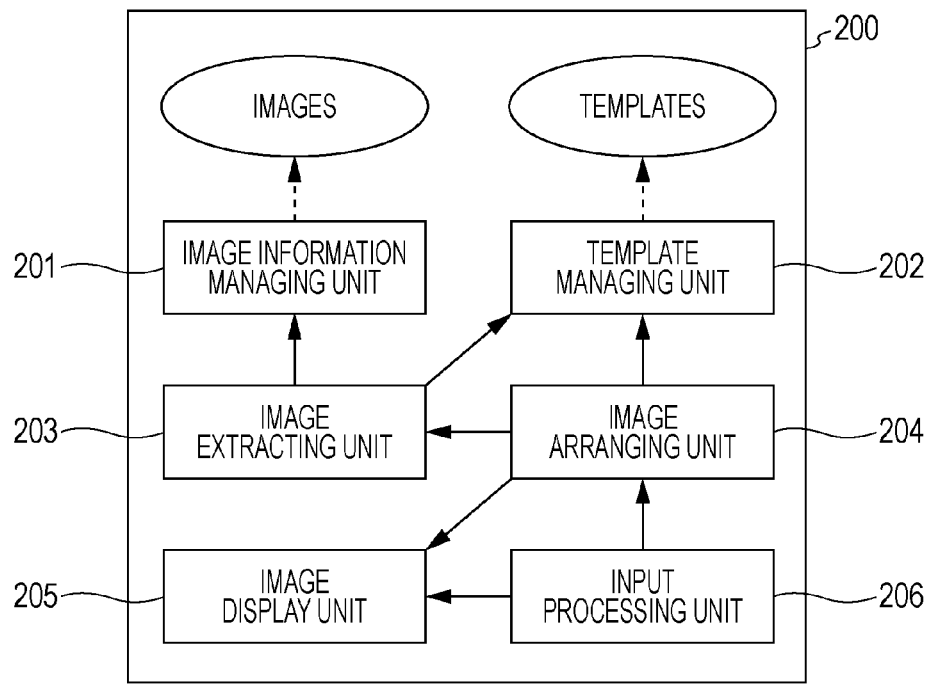
FIG. 2 is a block diagram showing an example of a software configuration of an image processing apparatus according to an exemplary embodiment of the present invention.

FIG. 2 is a block diagram showing an example of a software configuration of an image processing apparatus 200 according to an exemplary embodiment of the present invention.

An image information managing unit 201 of the image processing apparatus 200 manages information regarding images and provides the information to other modules in response to their requests. For example, the images may be accumulated in an internal storage device or an external storage device. The external storage device may be, for example, a storage device directly connected to the image processing apparatus 200, a storage device connected via a network, or a device, such as a digital camera, capable of storing image data. The images may also be disclosed on a web site.

The image information managing unit 201 manages images stored in these devices, attribute information attached to the images, and information obtained in image recognition. A template managing unit 202 manages templates, in which frames indicating a layout of images are defined. The template managing unit 202 provides information regarding the templates to other modules in response to their requests. In the templates, a relative relationship between images to be arranged is stored in association with the defined frames as a condition. The relative relationship between images indicates information representing a relative relationship between attribute values of respective images. Although a specific example will be described later, the relative relationship may be information representing a relationship between focal lengths of an image A and an image B, for example.

An image extracting unit 203 extracts, through the image information managing unit 201, target images based on the information provided from the template managing unit 202. An image arranging unit 204 acquires template information from the template managing unit 202 and arranges the images extracted by the image extracting unit 203 in the frames defined in the template information. An image display unit 205 writes, as drawing data, information regarding images arranged in the templates generated by the image arranging unit 204 and a content of user operations supplied from an input processing unit 206 in a VRAM of the output device 108. The input processing unit 206 receives operation instructions from users and requests the image display unit 205 to display the operation content. The input processing unit 206 also analyzes user operations received through the input device 107 to perform selection and data input operations, and transfers the content of the user operations to the image arranging unit 204 to control corresponding operations.

Figure 3:
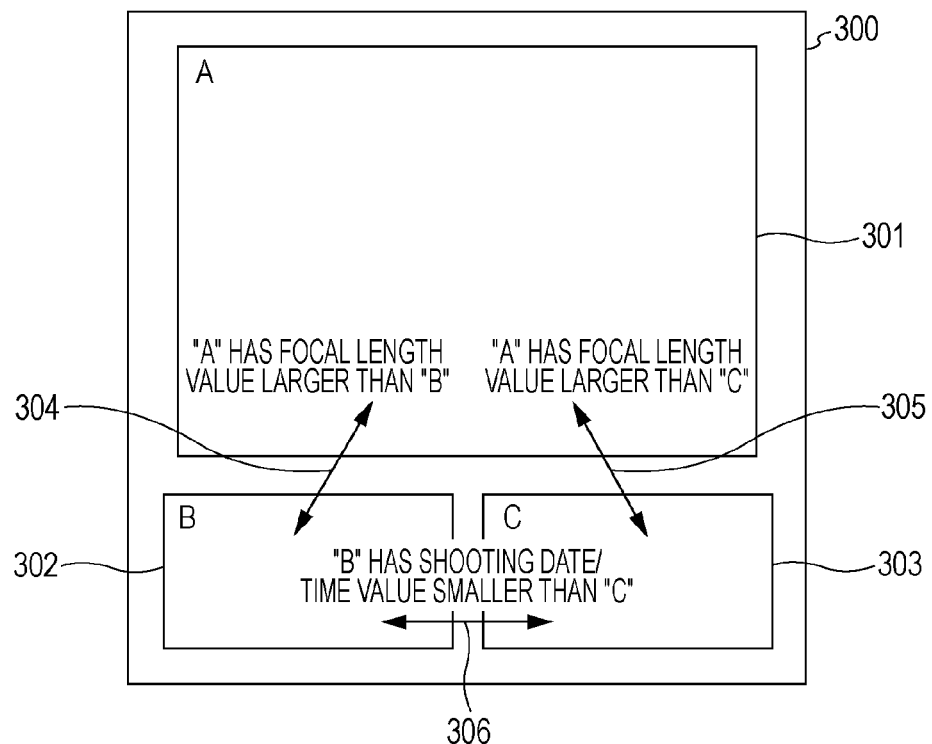
FIG. 3 is a diagram showing an example of content of a template setting according to an exemplary embodiment of the present invention.

FIG. 3 is a diagram showing an example of a content of a template setting according to an exemplary embodiment of the present invention.

A template 300, in which images are arranged, is an example of one page of an album. The template may collectively manage a plurality of pages. Here, the description will be given for an example of a template that manages one page, for convenience. Frames 301, 302, and 303 are defined in the template 300. Images are arranged in the frames 301, 302, and 303, whereby one page of an album is constituted. Positions and sizes of the frames are not necessarily fixed. For example, the size of the frame may be changed in accordance with a size or an aspect ratio of an image. The position of the frame may be shifted in response to the change in the size of the frame.

Conditions 304, 305, and 306 indicate relative relationships associated with the respective frames. In this example, the condition is set for two frames. The condition 304 that "A has a focal length value larger than B", i.e., a relative relationship that the image A is captured in close-up compared with the image B, is set for the frame 301 of the image A and the frame 302 of the image B. This condition indicates, at the same time, an opposite condition that "B has a focal length value smaller than A". The focal length utilized here is included in attribute information attached to an image and can be acquired through the image information managing unit 201.

Like the condition 304, a relative relationship regarding the focal length is set for the frame 301 of the image A and the frame 303 of an image C as the condition 305. The condition 306 indicating a relative relationship that "B has a shooting date/time value smaller than C" is set for the frame 302 of the image B and the frame 303 of the image C. This condition indicates, at the same time, an opposite condition that "C has a shooting date/time value larger than B". The shooting date/time utilized here can also be acquired from attribute information attached to an image.

Some example conditions indicating other relative relationships will be described below. A condition that A has an aperture value larger than B, a condition that A has an exposure value larger than B, a condition that A has a resolution value larger than B, and a condition that A has a distance to a subject (hereinafter, referred to as a subject distance) smaller than B can be utilized based on the attribute information. In this manner, all kinds of attribute information that are treated as values can be set as conditions indicating relative relationships.

A result of image recognition may be utilized as the attribute information. In this case, the result of previously performed image recognition may be attached to an image as the attribute information or image recognition may be performed at the time of arrangement of images. For example, conditions that A contains more people than B, A has a smiling degree higher than B, A has a brightness value higher than B, A has a tint value higher than B, and A has a motion blurring value smaller than B can be used. In this manner, all values resulting from image recognition can be set as conditions indicating relative relationships. In addition, a condition indicating a range, such as a condition indicating values equal to or greater than a specific value, may be set.

Figure 4:
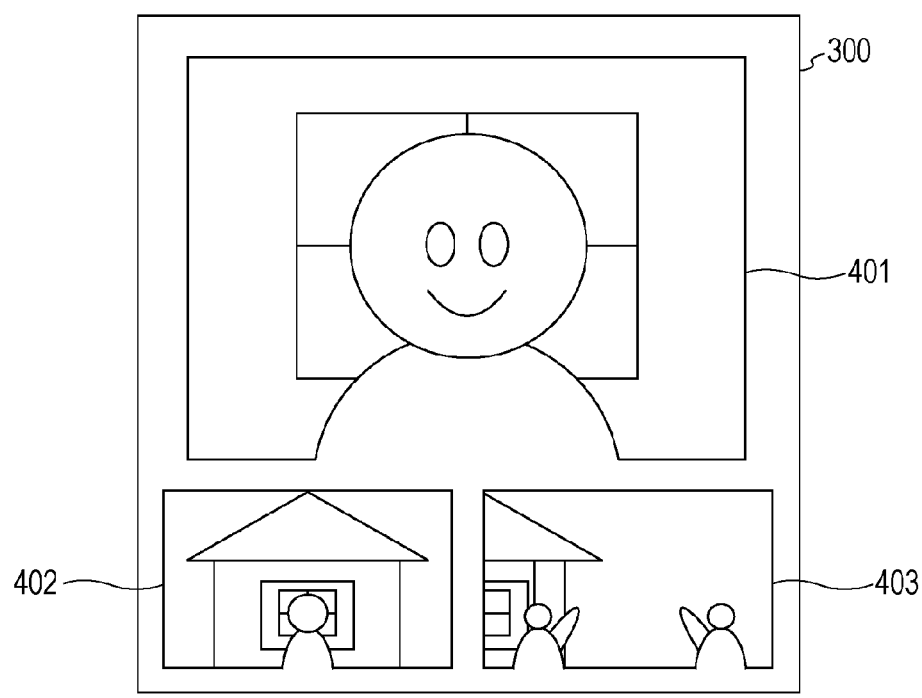
FIG. 4 is a diagram showing an example of an image layout according to an exemplary embodiment of the present invention.

FIG. 4 is a diagram showing an example of an image layout according to an exemplary embodiment of the present invention.

FIG. 4 shows an example case where images are extracted and arranged based on the template 300 shown in FIG. 3. Frames 401, 402, and 403 show a state where images are arranged in the frames 301, 302, and 303 shown in FIG. 3, respectively. Since a condition that an image arranged in the frame 301 has a larger focal length value is set for the frames 301, 302, and 303, a close-up image 401 compared with the images 402 and 403 is arranged. Since a close-up image attracting people's attention more than other images arranged in other frames can be arranged in the main frame, it is possible to stress a specific image.

A portrait image may be arranged in the main frame using an aperture value or a close-up image may be arranged in the main frame using a subject distance value. In this manner, a layout having variety may be realized. Furthermore, it is possible to set a condition so that an image having a higher smiling degree or a higher resolution value is arranged in the main frame.

A plurality of conditions may be set for a set of frames. In this manner, the probability that an intended image is arranged as desired may be increased. Since a condition that an image arranged in the frame 302 has a smaller shooting date/time value is set for the frames 302 and 303, the image 402 having a shooting date/time earlier than the image 403 is arranged. By arranging images in accordance with a chronological order, a layout, in which no chronological order exists, may be avoided.

FIG. 5 is a diagram showing an example of an image layout portraying a story according to an exemplary embodiment of the present invention.

In the example shown in FIG. 5, relative relationships 501-503 are set, as conditions, for frames 505-508 defined in a template 300. A detail of the conditions 501-503 is described in a condition frame 504. In this example, the conditions are set so that an image having a smaller subject distance value and a larger shooting date/time value is arranged in a larger frame located on the front side. As in this example, a plurality of conditions can be associated with a set of frames. By setting the conditions in this manner, gradual close-up images of a subject can be arranged like continuously shot pictures as shown in the example of FIG. 5. By setting conditions regarding relative relationships in consideration for the order of frames, it is possible to portray a story according to the order of the frames.

FIG. 6 is a flowchart showing an example of an image arranging process according to an exemplary embodiment of the present invention. Each step of the flowchart shown in FIG. 6 is executed under control of the CPU 102.

At STEP S601, template information is acquired from the template managing unit 202 shown in FIG. 2. Here, a list of frames, among frames defined in templates, for which relative relationships are set as conditions, is acquired. In STEP S602, it is determined whether a set of frames to be processed still exists in the list of frames acquired at STEP S601.

If the set of frames to be processed exists, the process proceeds to STEP S603. Alternatively, the process terminates. At steps starting from STEP S603, processing is performed on one set of frames contained in the list of frames. At STEP S603, the image extracting unit 203 shown in FIG. 2 extracts, through the image information managing unit 201 shown in FIG. 2, images satisfying a condition indicating a relative relationship associated with the set of frames. One method for extracting images may include setting one image as a criterion and other images satisfying the condition of the relative relationship set for the criterion image are extracted. If an image satisfying the condition is not found, the criterion image is replaced by another image. Images satisfying the condition are then extracted again. If there is a plurality of images satisfying the condition, a user may select one of the images or an image extracted first based on a predetermined condition, such as date, may be selected. Alternatively, an image having the closest or farthest relative relationship may be extracted.

At STEP S604, the image arranging unit 204 shown in FIG. 2 arranges the images extracted at STEP S603 in respective frames in accordance with the condition indicating the relative relationship associated with the set of frames. After STEP S604, the process is then performed on the next set of frames contained in the list of frames. More specifically, the processing starting from STEP S602 is repeated.

In the example shown in FIG. 6, images satisfying the condition of the relative relationship are automatically arranged. However, images satisfying the condition of the relative relationship may be automatically arranged in the rest of frames after a user manually arranges an image in a frame. In addition, the images may be automatically arranged in response to selection of a template, selection of a frame, or selection of a page. Although a list of frames for which a relative relationship is set as a condition is acquired at STEP S601, the frames may be processed from the top. In this manner, the set condition of the relative relationship may be acquired.

As described above, arranging images based on a relative relationship, such as a relationship that one image has a larger or smaller value than another image, an image layout including an outstanding main image may be realized. Setting a condition of a relative relationship in consideration for the arrangement order may result in an image layout portraying a story.

In a second exemplary embodiment, a description will be given for a case where images satisfying a condition of a relative relationship are automatically arranged in the rest of frames based on one or more images manually arranged by a user. More specifically, an exemplary embodiment in which, if an image satisfying a condition does not exist but an image satisfying the opposite condition exists, positions of the images are switched and the images are arranged in the frames will be described with reference to the accompanying drawings. Since an image processing apparatus according to the second exemplary embodiment has a configuration shown in FIGS. 1 and 2 described in the first exemplary embodiment, a description thereof is omitted herein.

Figure 7A:
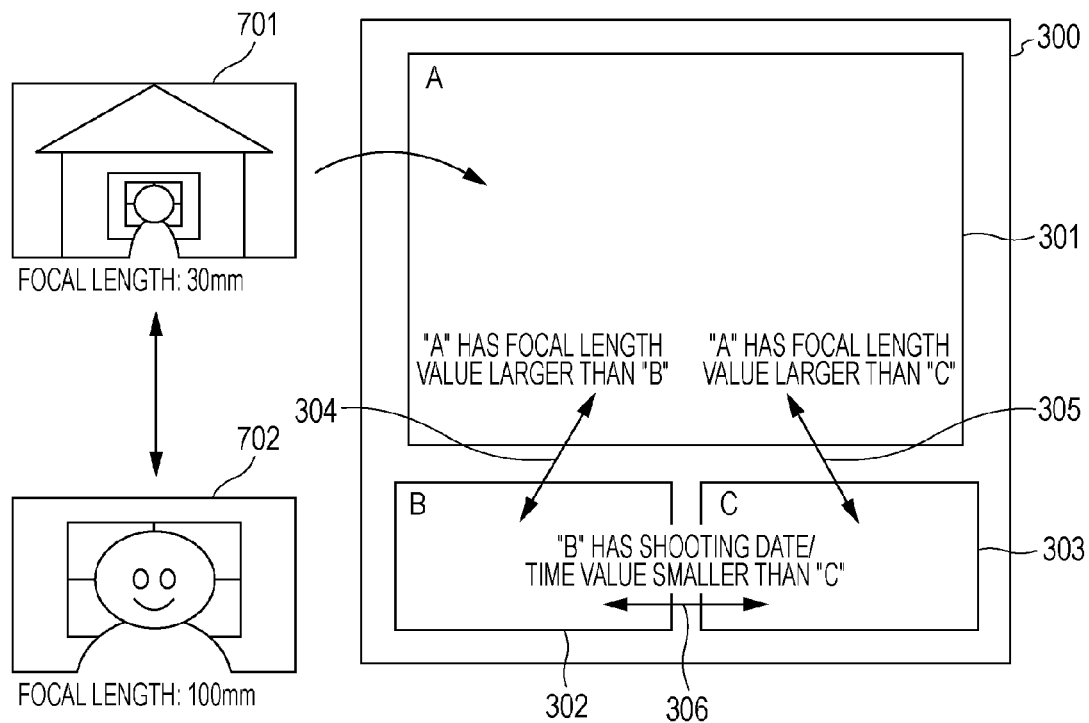
FIGS. 7A and 7B are diagrams showing an example of image switching according to an exemplary embodiment of the present invention.
Figure 7B:
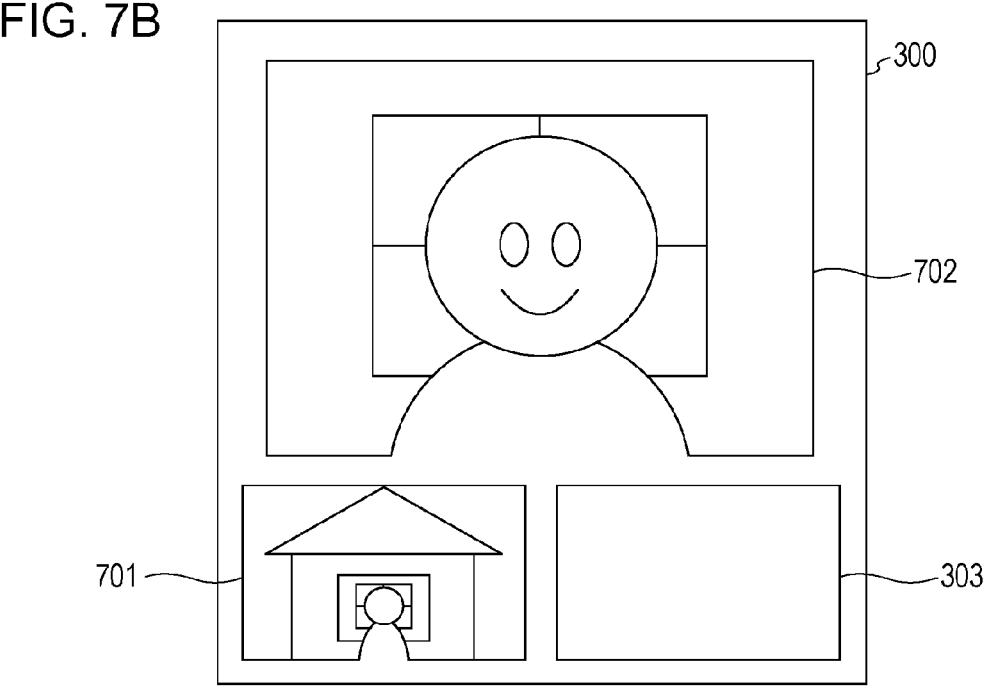

FIGS. 7A and 7B are diagrams showing an example of switching of images according to an exemplary embodiment of the present invention.

Referring to FIG. 7A, an image 701 is to be arranged in a frame 301 of a template 300 shown in FIG. 3 in accordance with a user instruction. FIG. 7A shows a case where an attempt to arrange an image having a focal length value smaller than the image 701 in a frame 302 on the basis of a condition 304 but an image having a focal distance value smaller than the image 701 does not exist. However, since a condition opposite to the condition 304 is satisfied, i.e., an image 702 having a focal distance value larger than the image 701 exists, positions of these two images 701 and 702 are switched. More specifically, as shown in FIG. 7B, the images 702 and 701 are arranged in the frames 301 and 302, respectively. In this manner, an image layout matching the user's intention may be provided. When a plurality of images satisfying the opposite condition exists, the images may be sequentially presented to a user as recommended image layout candidates.

Figure 8:
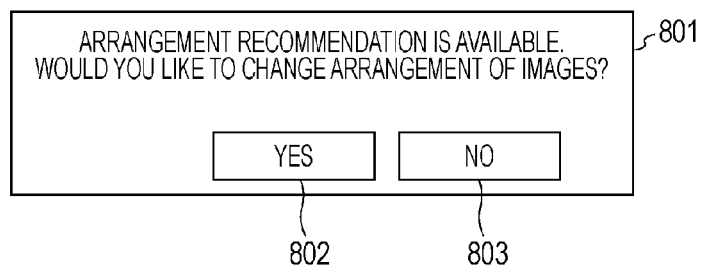
FIG. 8 is a diagram showing an example of an image switching confirmation dialog according to an exemplary embodiment of the present invention.

FIG. 8 is a diagram showing an example of an image switching confirmation dialog according to an exemplary embodiment of the present invention.

A dialog 801 is displayed when a recommended image layout is available as described in FIGS. 7A and 7B. A button 802 indicates that "an image layout is changed to a recommended one". When the button 802 is pressed, an image layout shown in FIG. 7B is set. A button 803 indicates that "the recommended image layout is not selected". When the button 803 is pressed, the image 701 is arranged in the frame 301 in FIG. 7A in accordance with the user's instruction instead of the image layout shown in FIG. 7B. By allowing a user to select whether to switch the images through such a dialog, a case where a user does not appreciate automatic switching of the images may be handled.

As described above, when an image satisfying a condition of a relative relationship does not exist but an image satisfying the opposite condition exists, the image satisfying the opposite condition to a user, a recommended image layout may be provided. When a user wants to arrange an image regardless of the condition, the user is allowed to select the image.

A description will now be given, with reference to the accompanying drawings, for a third exemplary embodiment where a difference between a value of one image and a value of another image satisfies a predetermined criterion or not, is set as a condition indicating a relative relationship. Since an image processing apparatus according to the third exemplary embodiment has a configuration shown in FIGS. 1 and 2 described in the first exemplary embodiment, a description thereof is omitted herein.

Figure 9:
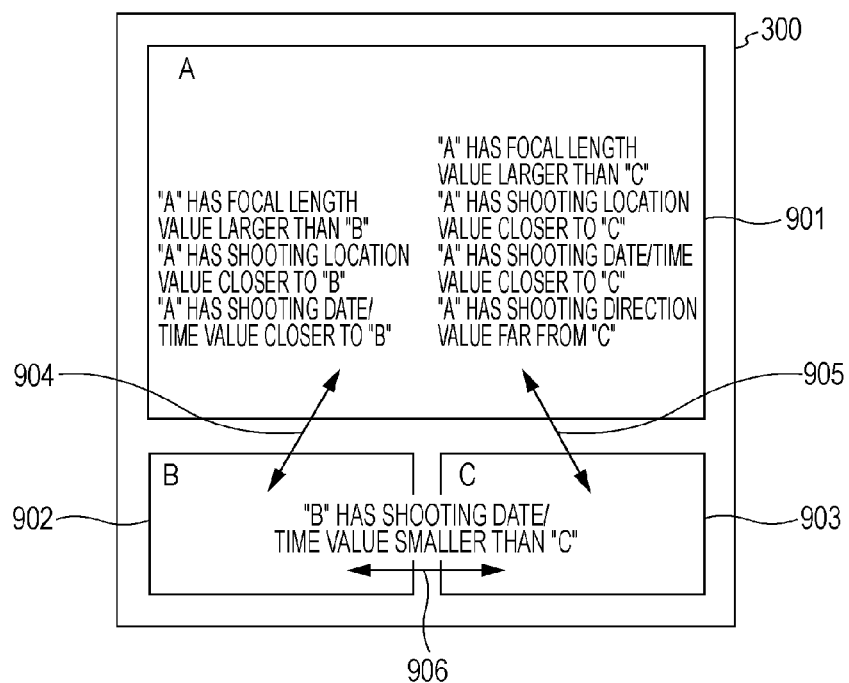
FIG. 9 is a diagram showing an example of a template according to an exemplary embodiment of the present invention.

FIG. 9 is a conceptual diagram showing an example of a template according to an exemplary embodiment of the present invention.

Frames 901, 902, and 903 are defined in the template. Conditions 904, 905, and 906 are relative relationships set for the frames. Here, the description will be given for an example where new conditions are added to the conditions 304, 305, and 306 of the example shown in FIG. 3. Regarding the condition 904, a relative relationship that "A has a shooting location value closer to B" and a relative relationship that "A has a shooting date/time value closer to B" are added to the condition 304. The closer shooting location value can be determined based on whether a difference between latitude/longitude values of images is within a predetermined range using latitude/longitude information included in attribute information of the images, for example. The closer shooting date/time value can be determined based on whether a difference between shooting date/time values of the images is smaller than a predetermined value.

By adding such a condition, images captured at a close location and a close shooting date/time are arranged in the frames A and B. In this manner, images that may be captured at a particular event are arranged. Accordingly, by preventing images not related to each other from being arranged on a single page but arranging images captured at a particular event in the single page, a consistent page may be realized.

Regarding the condition 905, a relative relationship that "A has a shooting direction value far from C" as well as the above-described relative relationships of the shooting location and shooting date/time are added to the condition 305 shown in FIG. 3. This can be determined based on whether a difference between shooting directions of images is larger than a predetermined value, for example. By adding a condition of a far shooting direction value, images captured at different angles are arranged in the frames A and C. Accordingly, arrangement of similar images in the frames A and C may be avoided. In this manner, an image layout having variety may be realized.

Comparing tint values of images or feature values of images, different types of images may be arranged. Regarding a condition for defining a difference between values, other kinds of conditions can be set in addition to the above-described conditions that a difference is larger or smaller than a predetermined value. For example, a condition that values are the same may be set. In this manner, a condition indicating the same location or the same subject may also be set.

Furthermore, a condition regarding a range of differences may be set. More specifically, a condition that the difference between values is within a predetermined range may be set. In this manner, images to be extracted may be narrowed down to some extent. Although an example in which images having a value difference that is within a predetermined range has been described, no image satisfying the predetermined range may exist. In such a case, images having values closest to the predetermined range may be arranged.

Although a condition is set for two frames in this example, a condition may be set for a plurality of frames. For example, by setting a condition that "A, B, and C are captured at the same shooting location and have far shooting direction values", images captured from the same location at different angles can be arranged in three frames. In this manner, a usage of arranging, for example, images captured from the same observation platform at different angles may be available.

As described above, arranging images captured at a single event in a single page or different types of images captured at a single event by arranging images having a difference satisfying a predetermined criterion in the frames is possible. Accordingly, arranging related images in frames in one page and accent images in some of the frames is available.

A fourth exemplary embodiment regarding how to deal with a case where images satisfying a condition of a relative relationship do not exist will be described with reference to the accompanying drawings. Where no image satisfying the condition exists, no image is arranged in a frame whose condition is not satisfied. A method for arranging an image while ignoring the condition is also available. Since an image processing apparatus according to the fourth exemplary embodiment has a configuration shown in FIGS. 1 and 2 described in the first exemplary embodiment, a description thereof is omitted herein.

First, a description will be given for not arranging an image in a frame whose condition is not satisfied.

FIGS. 10A and 10B are diagrams showing an example where an image is not arranged in a frame whose condition is not satisfied according to an exemplary embodiment of the present invention.

Referring to FIG. 10A, images 1001, 1002, and 1003 are managed by the image information managing unit 201 shown in FIG. 2. For convenience, three images are used here. A condition 1007 indicates a relative relationship set for frames A and B. More specifically, a condition that "A has a focal length value larger than B" and "A has a shooting date/time value larger than B" is set.

When an image satisfying this condition is extracted from the images 1001, 1002, and 1003, only the image 1003 has a larger focal length value. Accordingly, only the image 1003 satisfies the condition of the frame A. Since the images 1001 and 1002 have the focal length and shooting date/time values smaller than the image 1003, the images 1001 and 1002 satisfy the condition of the frame B. In this example, it is assumed that the image 1001 is arranged in the frame B as shown in FIG. 10B.

A condition 1008 indicates a relative relationship set for the frames A and C. More specifically, a condition that "A has a focal length value larger than C" and "A has a shooting date/time value smaller than C" is set. However, since an image having a focal length value smaller than the image 1003 arranged in the frame A and a shooting date/time value larger than the image 1003 does not exist among the images 1001, 1002, and 1003, no image is arranged in the frame C. In this case, as shown in FIG. 10B, no image is arranged in the frame C. Since the layout lacks one image, the frame B may be shifted to the center. Alternatively, a user may separately arrange an image in the empty frame C.

An example for arranging an image while ignoring the condition will now be described.

Figure 11A:
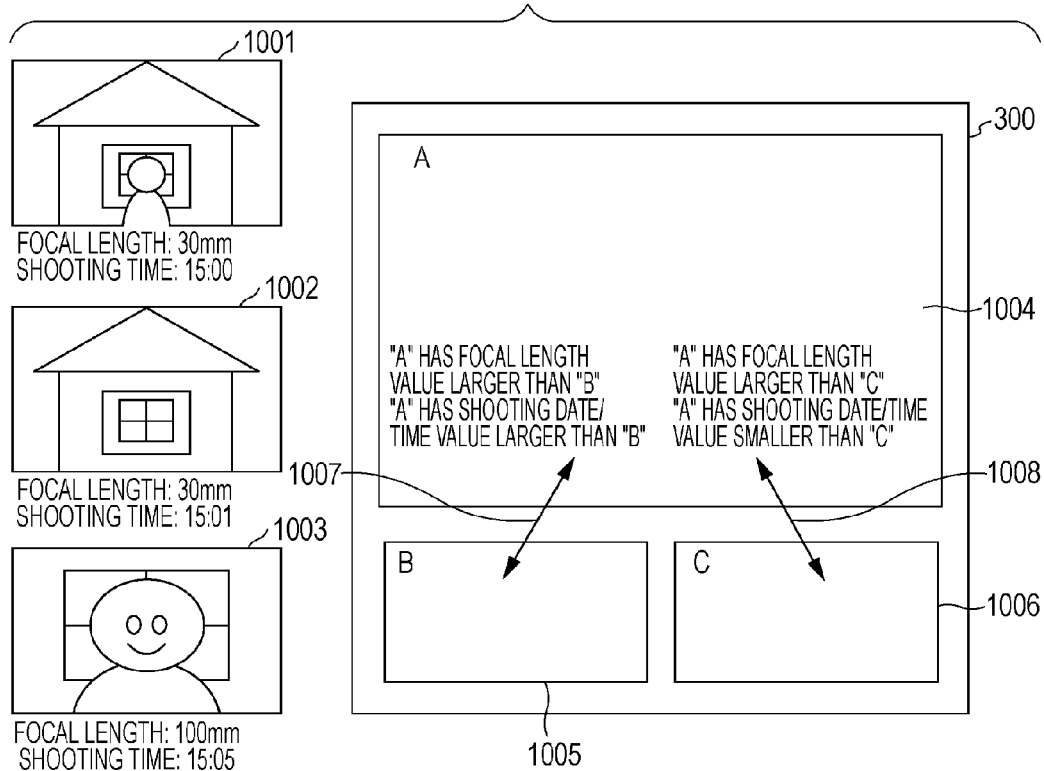
FIGS. 11A and 11B are diagrams showing an example in which an image is arranged in a frame whose condition is not satisfied while ignoring the condition according to an exemplary embodiment of the present invention.
Figure 11B:
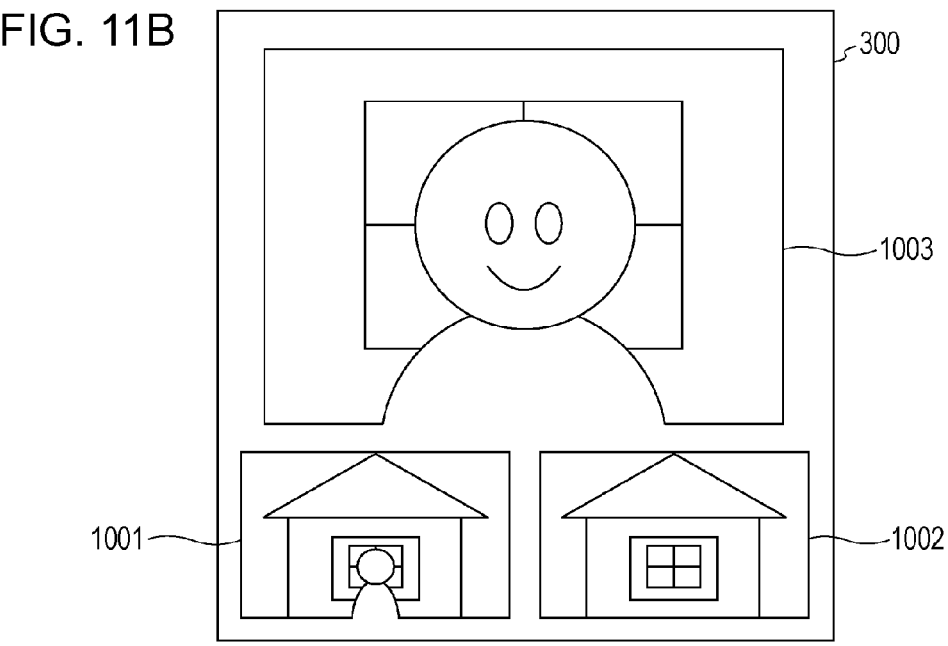

FIGS. 11A and 11B are diagrams showing an example where an image is arranged, while ignoring a condition, in a frame whose condition is not satisfied according to an exemplary embodiment of the present invention.

This example is substantially the same as that shown in FIGS. 10A and 10B. The difference from the example shown in FIGS. 10A and 10B is, as shown in FIG. 11B, an image 1002 not satisfying a condition 1008 is arranged in the frame C. By arranging an image while ignoring the condition, an empty frame is avoided.

Figure 12A:
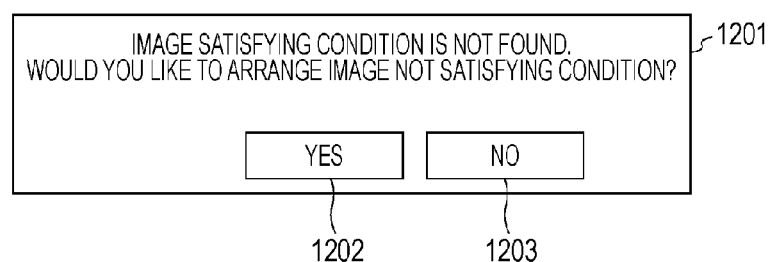
FIGS. 12A and 12B are diagrams showing example dialogs displayed when a condition is not satisfied according to an exemplary embodiment of the present invention.
Figure 12B:
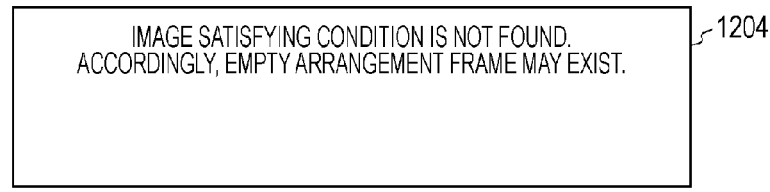

FIGS. 12A and 12B are diagrams showing example dialogs to be displayed when a condition is not satisfied according to an exemplary embodiment of the present invention.

A dialog 1201 shown in FIG. 12A is a confirmation dialog asking a user whether to arrange an image not satisfying a condition as described in FIGS. 11A and 11B. A button 1202 indicates that "the image not satisfying the condition is arranged". A button 1203 indicates that "the image not satisfying the condition is not arranged". By presenting such a dialog to a user, a request of a user not appreciating automatic arrangement of an image not satisfying the condition may be handled.

When a frame is empty because no image satisfying a condition exists as in the case described in FIGS. 10A and 10B, a warning dialog 1204 shown in FIG. 12B informs a user of such a scenario. By presenting a warning to the user, it is possible to inform the user of an empty frame. After displaying this dialog, a frame without an image may be displayed to prompt the user to arrange an image. When a plurality of frames not having images exists, the frames may be sequentially displayed.

As described above, adjusting the number of frames, arranging images if possible, or adjusting the layout to realize consistency even when images satisfying a condition of a relative relationship do not exist may be possible. By displaying a warning to the user, it is possible to prevent processing not intended by the user from being performed.

A fifth exemplary embodiment regarding a case of changing images arranged in some of frames associated with a condition of a relative relationship will be described with reference to the accompanying drawings. Since an image processing apparatus according to the fifth exemplary embodiment has a configuration shown in FIGS. 1 and 2 described in the first exemplary embodiment, a description thereof is omitted herein.

Figure 13A:
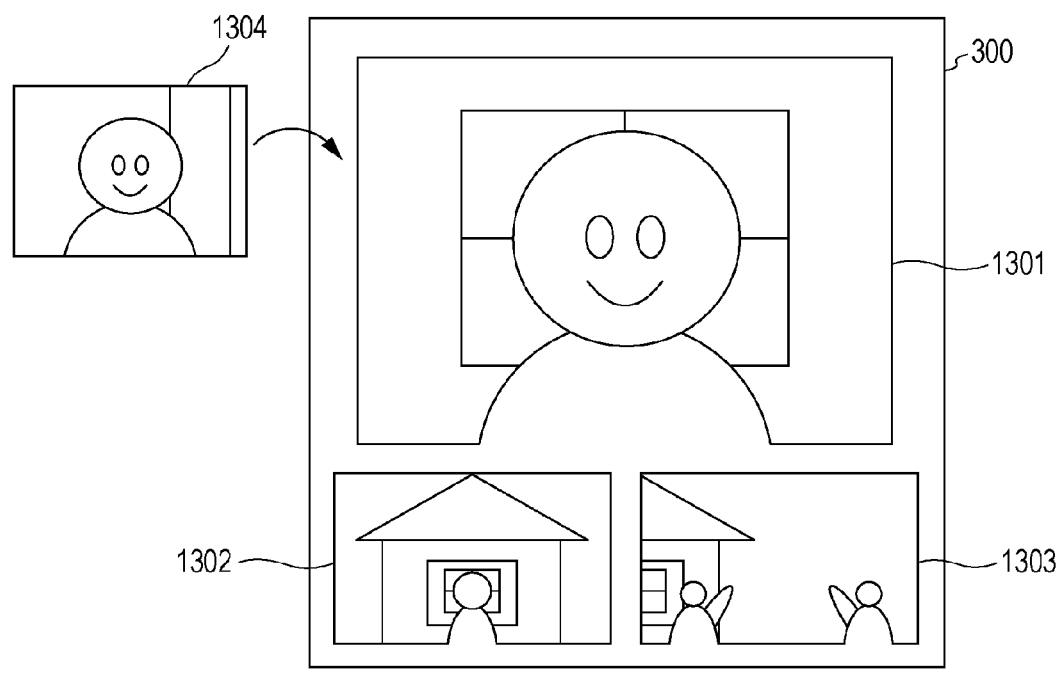
FIGS. 13A and 13B are diagrams showing an example in which images arranged in some frames are changed according to an exemplary embodiment of the present invention.
Figure 13B:
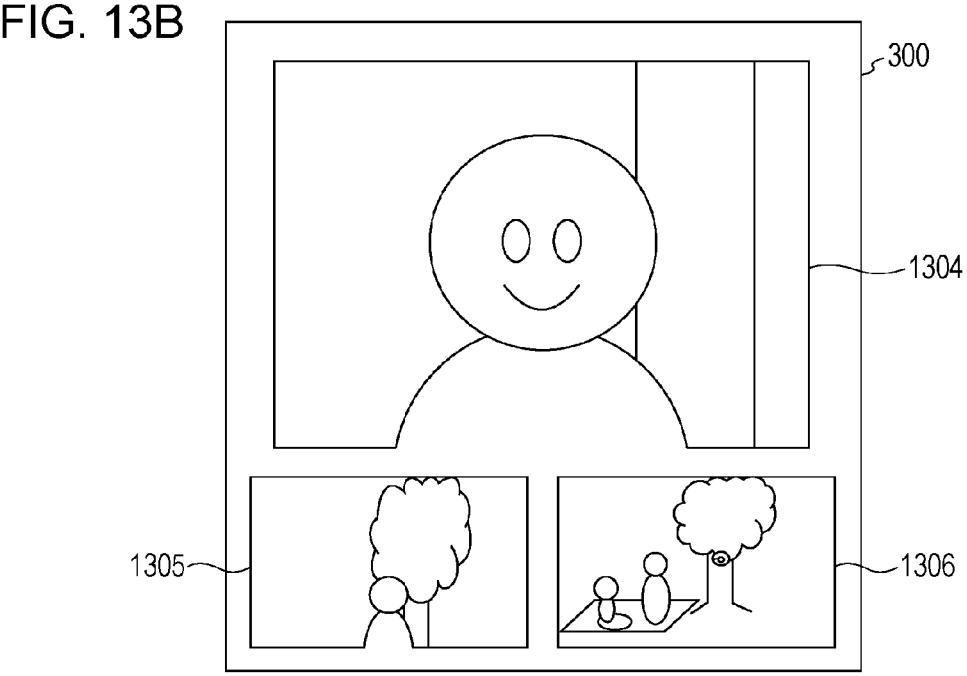

FIGS. 13A and 13B are diagrams showing an example of changing images arranged in some frames according to an exemplary embodiment of the present invention.

A description will be given for an example case using the template described in FIG. 9. Images 1301, 1302, and 1303 captured at a close location and a close time are arranged in accordance with set conditions. A condition for a close-up image, like the image 1301, is set for a large frame. Here, it is assumed that the image 1301 is captured when a subject visited a friend's house, for example. It is also assumed that the subject went on a picnic with the friend and an image 1304 is captured at that time.

FIG. 13A shows a state where the image 1301 is replaced by the image 1304 captured at the time of the picnic in accordance with a user's instruction. At this time, images may be rearranged based on a condition of a relative relationship associated with frames using the image 1304 to be changed as a criterion. The example of this case is shown in FIG. 13B. The image 1304 is arranged in a large frame, whereas images 1305 and 1306 captured at a close location and a close time, namely, at the time of the picnic, and from a distance larger than the image 1304 are selected and arranged. In this manner, even if images arranged in some frames are changed, a recommended image layout satisfying a condition of a relative relationship associated with the frames may be presented.

Figure 14:
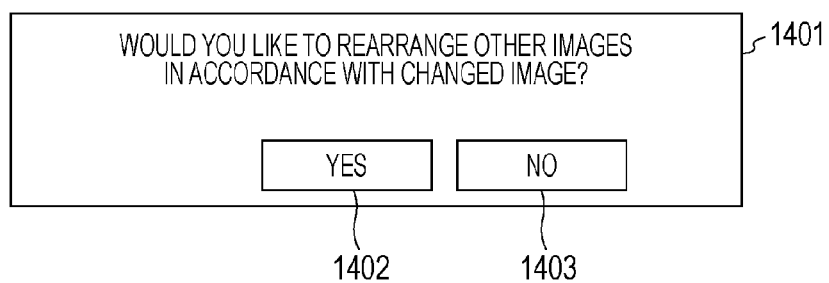
FIG. 14 is a diagram showing an example of a rearrangement confirmation dialog displayed in response to a change of images according to an exemplary embodiment of the present invention.

FIG. 14 is a diagram showing an example of a rearrangement configuration dialog displayed when images are changed according to an exemplary embodiment of the present invention.

A dialog 1401 is a confirmation dialog notifying a user whether to rearrange images of other frames in accordance with the condition of the relative relationship associated with the frames based on the changed image. A button 1402 indicates that "rearrangement of images is selected". A button 1403 indicates that "rearrangement of images is not selected". By confirming a user's intention through such a confirmation dialog, a case where the user wants to change only the image of the modified frame is also provided.

As described above, the image processing apparatus according to this exemplary embodiment can change images of other frames based on the changed image without violating the condition even if an image of one of the frames is changed. Accordingly, when a user has changed the theme of a page, it is possible to automatically change images of other frames to images having the same theme based on the condition of the relative relationship by changing one image. In addition, when the user wants to change only one image, it is possible to prevent other images not intended by the user from being changed by displaying the confirmation dialog.

Although the exemplary embodiments have been described in detail above, the present invention can be embodied as, for example, a system, an apparatus, a method, a program, or a recording medium. More specifically, the present invention may be applied to a system including a plurality of devices or an apparatus including a single device.

Additionally, a software program may be supplied to a system or an apparatus directly or from a remote place. A computer included in the system or the apparatus reads out and executes program codes of the supplied software program, whereby the functions of the above-described exemplary embodiments are achieved. Such a case is also included in the present invention. In this case, the supplied computer program corresponds to the flowcharts shown in the drawings in the exemplary embodiments.

Accordingly, the program codes to be installed in the computer to realize the functions of the present invention in the computer are also included in the present invention. That is, the present invention includes a computer program for realizing the functions of the present invention.

In this case, the computer program may be in any form, such as an object code, a program executed by an interpreter, or script data supplied to an OS, as long as the program has the functions of the program.

Types of a computer-readable recording medium for use in supplying the computer program include, for example, a floppy disk, a hard disk, an optical disc such as a CD-ROM, a CD-R, a CD-RW, or a DVD (DVD-ROM, DVD-R), a magneto-optical disk such as an MO, a magnetic tape, and a nonvolatile memory card.

In addition, the program supplying method includes a case where a user accesses an Internet web site using a browser of a client computer and downloads the computer program according to an exemplary embodiment of the present invention to a recording medium, such as a hard disk, from the web site. In this case, the downloaded program may be a compressed file having an automatic installation function. Additionally, program codes constituting the program according to the exemplary embodiment of the present invention may be divided into a plurality of files and each of the plurality of files may be downloaded from different web sites, whereby the present invention can be realized. That is, the present invention also includes a WWW server that allows a plurality of users to download program files for realizing the functions of the present invention in a computer.

The program according to the exemplary embodiment of the present invention may be encrypted and recorded on a recording medium, such as a CD-ROM, and the recording medium may be distributed to users. In this case, users satisfying a predetermined condition may be permitted to download key information for decrypting the encryption from a web site via the Internet, execute the encrypted program using the key information, and install the program in a computer.

In addition to realization of the functions according to the above-described exemplary embodiments by the computer's execution of the read out program codes, an operating system running on the computer may execute part of or all of the actual processing on the basis of instructions of the program code, whereby the functions of the exemplary embodiment may be realized. In this case, the OS or the like execute part of or all of the actual processing and the functions of the above-described embodiments are realized by the processing.

Furthermore, the program read out from a recording medium may be written in a memory of a function expansion board inserted into the computer or a function expansion unit connected to the computer, whereby some of or all of the functions of the above-described exemplary embodiments may be realized. In this case, a CPU or the like included in the function expansion board or the function expansion unit may execute part of or all of the actual processing on the basis of instructions of the program after the program is written in the memory of the function expansion board or the function expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-084101 filed on Mar. 27, 2008, which is hereby incorporated by reference herein in its entirety.

What is claimed is:

1. An image processing apparatus comprising:
an acquiring unit configured to acquire a condition associated with a set of frames, wherein the condition indicates a relationship between each piece of attribute information of images to be arranged in the set of frames;
an arranging unit configured to arrange a set of images which meets the condition associated with the set of frames;
a changing unit configured to change, in response to a user's instruction, one arranged image of the set of images to a different image in the set of images which meets the condition associated with the set of frames;
a confirmation unit configured to confirm, in a case where the one arranged image is changed to the different image by the changing unit, whether or not the user intends to rearrange an arranged image in a frame other than a frame in which the different image is arranged, wherein the confirmation unit presents the user with an image switching confirmation request, where the user may instruct to rearrange the arranged image in accordance with the condition associated with the set of frames, or the user may instruct against rearranging the arranged image in accordance with the condition associated with the set of frames;
a comparing unit configured to compare attribute information of the different image and each piece of attribute information of a plurality of images; a re-extracting unit configured to, based on the comparison, extract an image to be arranged in the frame other than the frame in which the different image is arranged, from the plurality of images, in a case that a relationship between the image to be arranged and the different image meets the condition associated with the set of frames; and
a rearranging unit configured to automatically rearrange the arranged image in the frame other than the frame in which the different image is arranged, in accordance with the condition associated with the set of frames and attribute information of the different image, if the user instructs to rearrange the arranged image, and wherein the rearranging unit rearranges the image to be arranged extracted by the re-extracting unit.

2. The apparatus according to claim 1, wherein a plurality of conditions is set for a single set of frames.

3. The apparatus according to claim 1, wherein the condition associated with the set of frames indicates a relationship between values of attribute information of the set of images.

4. The apparatus according to claim 3, wherein the attribute information includes a value resulting from image recognition.

5. The apparatus according to claim 3, wherein the relationship between the values of the attribute information is a magnitude relationship.

6. The apparatus according to claim 3, wherein the relationship between the values of the attribute information is a relationship that a difference between one value and another value satisfies a predetermined criterion.

7. The apparatus according to claim 1, wherein the arranging unit arranges images closest to the condition without satisfying the condition associated with the set of frames in a case that images satisfying the condition associated with the set of frames cannot be extracted from the plurality of images.

8. The apparatus according to claim 1, wherein the arranging unit arranges images not satisfying the condition associated with the set of frames in a case that images satisfying the condition associated with the set of frames cannot be extracted from the plurality of images.

9. The apparatus according to claim 1, further comprising:
an instructing unit configured to arrange an image specified by a user in a frame specified by the user,
wherein the acquiring unit acquires the information regarding the set of frames, at least one of which is specified by the instructing unit.

10. The apparatus according to claim 1, wherein the arranging unit arranges an image satisfying a condition opposite to the condition associated with the set of frames when an image satisfying the condition associated with the set of frames cannot be extracted.

11. A method comprising:
acquiring a condition associated with a set of frames, wherein the condition indicates a relationship between each piece of attribute information of images to be arranged in the set of frames;
arranging a set of images which meets the condition associated with the set of frames;
changing, in response to a user's instruction, one arranged image of the set of images to a different image in the set of images which meets the condition in the set of frames;
confirming, in a case where the one arranged image is changed to the different image, whether or not the user intends to rearrange an arranged image in a frame other than a frame in which the different image is arranged, wherein the user is presented with an image switching confirmation request, where the user may instruct to rearrange the arranged image in accordance with the condition associated with the set of frames, or the user may instruct against rearranging the arranged image in accordance with the condition associated with the set of frames;
comparing attribute information of the different image and each piece of attribute information of a plurality of images; performing image extraction based on the comparison, using a processor, by extracting an image to be arranged in the frame other than the frame in which the different image is arranged, from the plurality of images, in a case that a relationship between the image to be arranged and the different image meets the condition associated with the set of frames; and
rearranging, automatically the arranged image in the frame other than the frame in which the different image is arranged, in accordance with the condition associated with the set of frames and attribute information of the different image, if the user instructs to rearrange the arranged image, and rearranging the extracted image to be arranged.

12. A non-transitory computer-readable storage medium storing a program to be executed by a computer that causes the computer to perform a method, the method comprising:
acquiring a condition associated with a set of frames, wherein the condition indicates a relationship between each piece of attribute information of images to be arranged in the set of frames;
arranging a set of images which meets the condition associated with the set of frames;
changing, in response to a user's instruction, one arranged image of the set of images to a different image in the set of images which meets the condition in the set of frames;
confirming, in a case where the one arranged image is changed to the different image, whether or not the user intends to rearrange an arranged image in a frame other than a frame in which the different image is arranged, wherein the user is presented with an image switching confirmation request, where the user may instruct to rearrange the arranged image in accordance with the condition associated with the set of frames, or the user may instruct against rearranging the arranged image in accordance with the condition associated with the set of frames;
comparing attribute information of the different image and each piece of attribute information of a plurality of images; performing image extraction based on the comparison, using a processor, by extracting an image to be arranged in the frame other than the frame in which the different image is arranged, from the plurality of images, in a case that a relationship between the image to be arranged and the different image meets the condition associated with the set of frames; and
rearranging, automatically the arranged image in the frame other than the frame in which the different image is arranged, in accordance with the condition associated with the set of frames and attribute information of the different image, if the user instructs to rearrange the arranged image, and rearranging the extracted image to be arranged.

13. An image processing apparatus comprising:
an acquiring unit configured to acquire a condition associated with a set of frames, wherein the condition indicates a relationship between each piece of attribute information of images to be arranged in the set of frames;
an arranging unit configured to arrange a set of images which meets the condition associated with the set of frames;
a changing unit configured to change, in response to a user's instruction, one arranged image of the set of images which meets the condition associated with the set of frames to a different image;
a confirmation unit configured to confirm whether or not the user intends to rearrange an arranged image in a frame other than a frame in which the different image is arranged, wherein the confirmation unit presents the user with an image switching confirmation request, where the user may instruct to rearrange the arranged image in accordance with the condition associated with the set of frames, or the user may instruct against rearranging the arranged image in accordance with the condition associated with the set of frames;
a rearranging unit configured to automatically rearrange the arranged image in the frame other than the frame in which the different image is arranged, in accordance with the condition associated with the set of frames and attribute information of the different image, if the user instructs to rearrange the arranged image;
a comparing unit configured to compare attribute information of the different image and each piece of attribute information of a plurality of images; and
a re-extracting unit configured to, based on the comparison, extract an image to be arranged in the frame other than the frame in which the different image is arranged, from the plurality of images, in a case that a relationship between the image to be rearranged and the different image meets the condition associated with the set of frames,
wherein the rearranging unit arranges the image to be arranged extracted by the re-extracting unit.

14. A method comprising:
acquiring a condition associated with a set of frames, wherein the condition indicates a relationship between each piece of attribute information of images to be arranged in the set of frames;
arranging a set of images which meets the condition associated with the set of frames; changing, in response to a user's instruction, one arranged image of the set of images which meets the condition associated with the set of frames to a different image;

confirming whether or not the user intends to rearrange an arranged image in a frame other than a frame in which the different image is arranged, wherein the confirming presents the user with an image switching confirmation request, where the user may instruct to rearrange the arranged image in accordance with the condition associated with the set of frames, or the user may instruct against rearranging the arranged image in accordance with the condition associated with the set of frames;

rearranging automatically the arranged image in the frame other than the frame in which the different image is arranged, in accordance with the condition associated with the set of frames and attribute information of the different image, if the user instructs to rearrange the arranged image;

comparing attribute information of the different image and each piece of attribute information of a plurality of images; and re-extracting, based on the comparison, extract an image to be arranged in the frame other than the frame in which the different image is arranged, from the plurality of images, in a case that a relationship between the image to be rearranged and the different image meets the condition associated with the set of frames, wherein the rearranging arranges the image to be arranged extracted.

15. A non-transitory computer-readable storage medium storing a program for causing a computer to execute the method according to claim 14.

* * * * *